United States Patent
Patten et al.

(10) Patent No.: US 10,183,337 B2
(45) Date of Patent: Jan. 22, 2019

(54) LASER AUGMENTED DIAMOND DRILLING APPARATUS AND METHOD

(71) Applicant: Western Michigan University Research Foundation, Kalamazoo, MI (US)

(72) Inventors: John A. Patten, Kalamazoo, MI (US); Hossein Mohammadi, Kalamazoo, MI (US)

(73) Assignee: The Board of Trustees of Western Michigan University, Kalamazoo, MI (US)

( * ) Notice: Subject to any disclaimer, the term of this patent is extended or adjusted under 35 U.S.C. 154(b) by 0 days.

(21) Appl. No.: 15/337,617

(22) Filed: Oct. 28, 2016

(65) Prior Publication Data
US 2017/0120345 A1 May 4, 2017

Related U.S. Application Data

(60) Provisional application No. 62/248,863, filed on Oct. 30, 2015.

(51) Int. Cl.
*B23P 25/00* (2006.01)
*B23B 41/00* (2006.01)
(Continued)

(52) U.S. Cl.
CPC .............. *B23B 41/00* (2013.01); *B23B 35/00* (2013.01); *B23B 51/08* (2013.01);
(Continued)

(58) Field of Classification Search
CPC ....... B23P 25/006; B23P 25/03; B23P 25/003; B23K 26/0093; B23B 2260/092
(Continued)

(56) References Cited

U.S. PATENT DOCUMENTS 4,530,627 A * 7/1985 Kosmowski ........... B23Q 3/069
144/135.2
5,409,376 A 4/1995 Murphy
(Continued)

FOREIGN PATENT DOCUMENTS

EP 1741394 A1 1/2007

OTHER PUBLICATIONS

Kai Egashira et al., "Edge finishing and deburring of back surfaces of microholes using micro-cutting tools," article, Sep. 29, 2012, 7 pages.
(Continued)

*Primary Examiner* — Daniel Howell
*Assistant Examiner* — Yasir Diab
(74) *Attorney, Agent, or Firm* — Price Heneveld LLP

(57) ABSTRACT

A laser beam is transmitted through a drill bit comprising diamond or other suitable light-transmitting material having sufficient hardness. The laser beam exits a tip of the drill bit, thereby heating and softening the material being drilled at and/or near the interface of the drill with the material being drilled. The process may be utilized to drill hard and brittle materials such as ceramics and semiconductors, composites and ceramic matrix composites. The process may cause high pressure phase transformation, resulting in a more ductile and plastic material near the drill point/tip. The process provides more rapid drilling, improved surface quality in drilled holes, and less tool wear.

18 Claims, 14 Drawing Sheets

(51) Int. Cl.
| | |
|---|---|
| B23B 51/08 | (2006.01) |
| B23K 26/00 | (2014.01) |
| B23B 35/00 | (2006.01) |
| B23K 26/08 | (2014.01) |
| B23K 26/0622 | (2014.01) |
| B23K 101/20 | (2006.01) |
| B23K 103/00 | (2006.01) |

(52) U.S. Cl.
CPC ...... *B23K 26/0093* (2013.01); *B23K 26/0622* (2015.10); *B23K 26/0823* (2013.01); *B23B 2226/18* (2013.01); *B23B 2226/27* (2013.01); *B23B 2226/31* (2013.01); *B23B 2226/315* (2013.01); *B23B 2250/12* (2013.01); *B23B 2251/14* (2013.01); *B23B 2251/18* (2013.01); *B23B 2251/50* (2013.01); *B23B 2260/092* (2013.01); *B23K 2101/20* (2018.08); *B23K 2103/50* (2018.08); *B23P 25/006* (2013.01); *Y10S 408/701* (2013.01)

(58) Field of Classification Search
USPC ............................ 219/121.6, 121.65, 121.84
See application file for complete search history.

(56) References Cited

U.S. PATENT DOCUMENTS

| | | | |
|---|---|---|---|
| 6,419,484 B1 | 7/2002 | DaSilva et al. | |
| 6,851,488 B2 | 2/2005 | Batarseh | |
| 7,257,879 B1* | 8/2007 | Jancso | B23C 3/28 |
| | | | 219/121.67 |
| 7,487,834 B2 | 2/2009 | Reed et al. | |
| 8,053,706 B2 | 11/2011 | Shin | |
| 2010/0065536 A1* | 3/2010 | Patten | B23K 26/0093 |
| | | | 219/121.66 |
| 2010/0078414 A1 | 4/2010 | Perry et al. | |
| 2010/0301013 A1 | 12/2010 | Conneely et al. | |
| 2012/0219371 A1* | 8/2012 | Craig | B23C 3/02 |
| | | | 408/1 R |
| 2012/0255774 A1 | 10/2012 | Grubb et al. | |
| 2013/0075373 A1 | 3/2013 | Chang et al. | |
| 2013/0112478 A1 | 5/2013 | Braga et al. | |
| 2014/0027178 A1 | 1/2014 | Jeffryes et al. | |
| 2015/0240564 A1 | 8/2015 | Wang et al. | |

OTHER PUBLICATIONS

Brian S. Dutterer et al., "Diamond milling of an Alvarez lens in germanium," article, Dec. 21, 2013, 11 pages.
A.M. Kovalchenko, "Studies of the Ductile Mode of Cutting Brittle Materials (A Review)," Journal of Superhard Materials, Dec. 25, 2012, vol. 35, No. 5, pp. 259-276. 18 pages.
Cheong et al., "Identification and control for micro-drilling productivity enhancement," International Journal of Machine Tools & Manufacture, Jan. 15, 1998, pp. 1539-1561, 23 pages.
Huo et al., "Surface and subsurface characterisation in micromilling of monocrystalline silicon," Publication, May 21, 2015, 13 pages.
Katahira et al., "A novel technique for reconditioning polycrystalline diamond tool surfaces applied for silicon micromachining," CIRP Annals-Manufacturing Technology, vol. 60, Issue 1, Apr. 13, 2011, pp. 591-594, 4 pages.
Cheng et al., "Design and development of PCD micro straight edge end mills for micro/ nano machining of hard and brittle materials," Journal of Mechanical Science and Technology, vol. 24, Issue 11, Dec. 22, 2010, pp. 2261-2268, 8 pages.
S.P. Leo Kumar et al., "A Review on Current Research Aspects in Tool-Based Micromachining Processes," Materials and Manufacturing Processes, 29:11-12, 1291-1337, DOI , Aug. 19, 2014, 48 pages.

M. A. Camara, "State of the Art on Micromilling of Materials, a Review," ScienceDirect, vol. 28, Issue 8, pp. 673-685, Sep. 12, 2012, 13 pages.
"A closed form solution for laser drilling of silicon nitride and alumina ceramics" Journal of Materials Processing Technology 140 (2003) 260-263.
A. Luft et al, "A study of thermal and mechanical effects on materials induced by pulsed laser drilling" Applied Physics A 63, 93-101 (1996).
Zhiyue Xu et al, "Application of High Powered Lasers to Perforated Completions", Oct. 13-16, 2003, Jacksonville, Florida, 6 pages.
Hossein Mohammadi and John A. Patten, "Micro-Laser Assisted Drillling of Single Crystal Silicon in Ductile Regime", Manufacturing Research Center, Western Michigan University, Kalamazoo, MI, 2015 Annual Meeting vol. 62, pp. 254-257.
Hossein Mohammadi, Barkin Bakir and John A. Patten, "Laser Augmented Diamond Drillling of Hard and Brittle Materials", Manufacturing Research Center, Western Michigan University, Kalamazoo, MI, 2016 Annual Meeting vol. 65, pp. 72-77.
Hossein Mohammadi and John A. Patten, "Laser Augmented Diamond Drilling Operation Using a Rotating Tool Design", Manufacturing Research Center, Western Michigan University, Kalamazoo, MI, 2017 Annual Meeting vol. 67, pp. 590-592.
N. Rajaram et al, "CO2 laser cut quality of 4130 steel", International Journal of Machine Tools & Manufacture 43 (2003) 351-358, Wichita KS.
X. Cheng et al, "Design and development of a micro polycrystalline diamond ball end mill for micro/nano freeform machining of hard and brittle materials", Journal of Micromechanics and Microengineering, 2009 IOP Publishing LTD, pp. 1-10.
Richard Parker et al, "Drilling Large Diameter Holes in Rocks Using Multiple Laser Beams", 6 pages.
Deepak Ravindra & John Patten (2011), "Ductile Regime Single Point Diamond Turning of Quartz Resulting in an Improved and Damage-Free Surface", Machining Science and Technology, 15:4, 357-375, DOI: 10.1080/10910344.2011.620909.
Chwan-Hueitsai et al, "Investigation of underwater laser drilling for brittle substrates", Journal of Materials Processing Technology 209 (2009) 2838-2846.
Avanish Kumar Dubey et al, "Laser Beam Machining—A Review", International Journal of Machine Tools & Manufacture 48 (2008) 609-628.
P.A. Atanasov et al, "Laser drilling of silicon nitride and alumina ceramics: A numerical and experimental study", Journal of Applied Physics 89, 2013 (2001); doi: 10.1063/1.1334367.
"Laser helical drilling of silicon wafers with ns to fs pulses: Scanning electron microscopy and transmission electron microscopy characterization of drilled through-holes", Journal of Laser Applications vol. 18, No. 2 May 2006, pp. 85-92.
Anoop N. Samant et al, "Laser machining of structural ceramics—A review", Journal of European Ceramic Society 29 (2009) 969-993.
Hwang et al, "Liquid-assisted femtosecond laser drilling of straight and three-dimensional microchannels in glass", Applied Physics A 79, 605-612 (2004).
Morgan et al, "Micro machining glass with polycrystalline diamond tools shapes by micro electro discharge machining", Journal of Micromechanics and microengineering, Institute of Physics Publishing (2004) 1687-1692.
Egashira et al, "Micro-drilling of monocrystalline silicon using a cutting tool", Journal of the International Societies for Precision Engineering and Nanotechnology 26 (2002) 263-268.
Park et al, "Prevention of Exit Crack in Micro Drilling of Soda-Lime Glass", School of Mehanical and Aerospace Engineering, Seoul National University, Seoul, Korea, 4 pages.
Hossein Mohammadi and John A. Patten, "Laser Augmented Diamond Drilling: A New Technique to Drill Hard and Brittle Materials", Western Michigan University, Kalamazoo, MI, Procedia Manufacturing vol. 5, 2016 pp. 1337-1347.
Dornfeld et al, "Recent Advances in Mechanical Micromachining", Annals of the CIRP vol. 55/2/2006, pp. 745-768.
Zhiyue Xu et al, "Rock Perforation by Pulsed ND: Yag Laser", Proceedings of the 23rd International Congress on Applications of Lasers and Electro-Optics 2004, 5 pages.

(56) References Cited

OTHER PUBLICATIONS

Lin Li et al., "Sequential Laser and EDM Micro-drilling for Next Generation Fuel Injection Nozzle Manufacture", Annals of the CIRP vol. 55/1/2006, 4 pages.
Z. Xu et al, "Specific Energy for Laser Removal of Rocks", Submitted for publication in Proceedings of the 20th International Congress on Applications of Lasers & Electro-Optics, Oct. 15-18, 2001, Jacksonville, Florida, 8 pages.
E. Coyne et al., "STEM (scanning transmission electron microscopy) analysis of femtosecond laser pulse induced damage to bulk silicon", Applied Physics A 81, 271-378 (2005).
Y. Matsoka et al., "The characteristics of laser micro drilling using a Bessel beam", Applied Physics A 84, 423-430 (2006).

\* cited by examiner

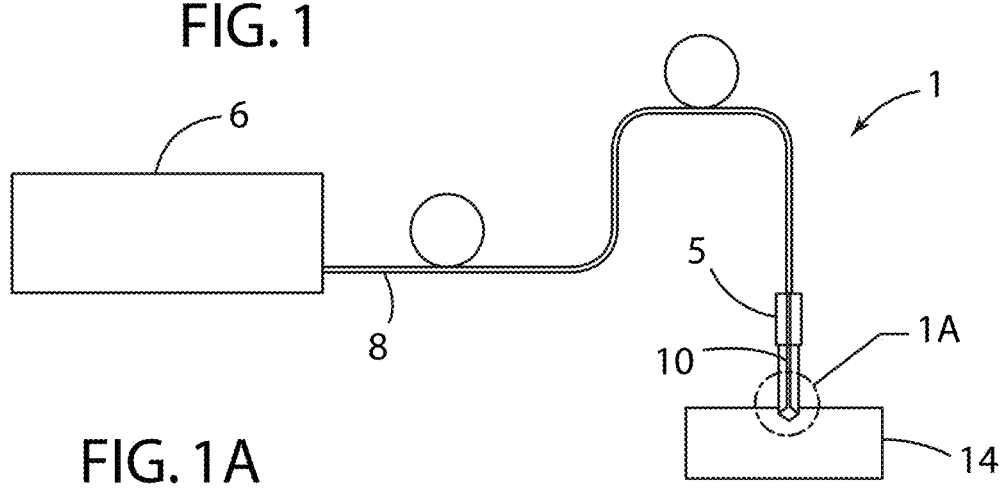
FIG. 1
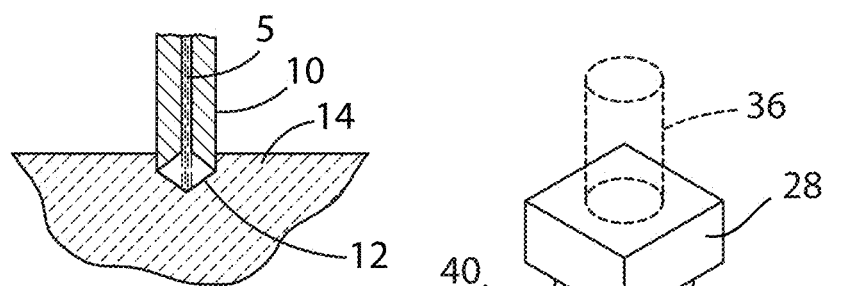
FIG. 1A
FIG. 2
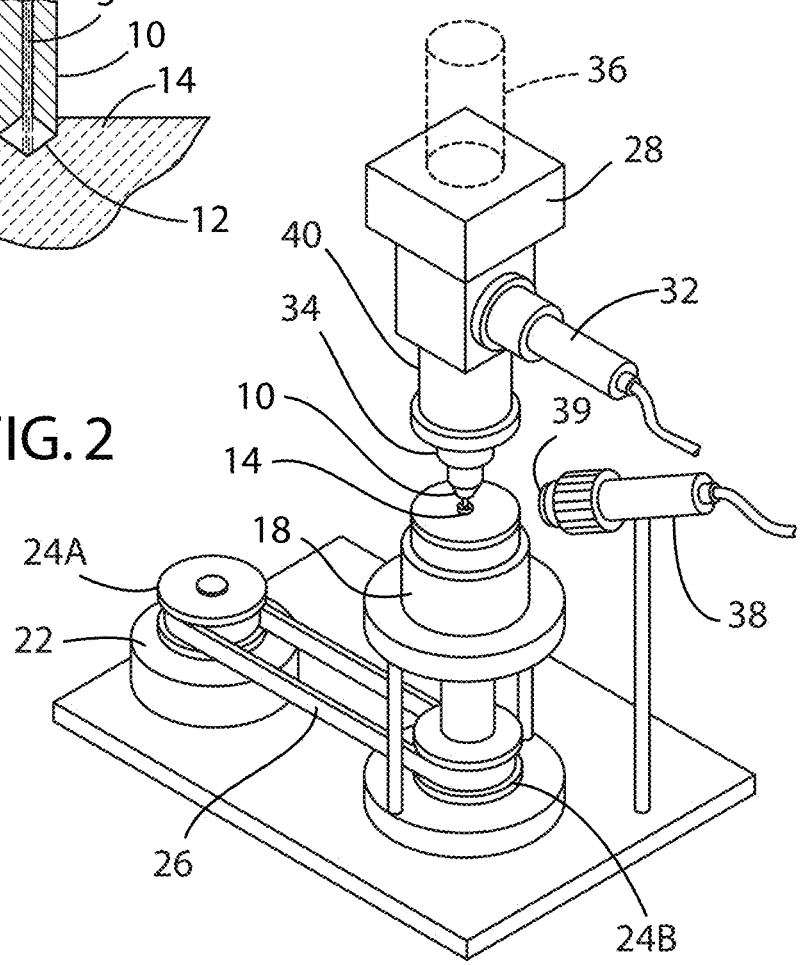

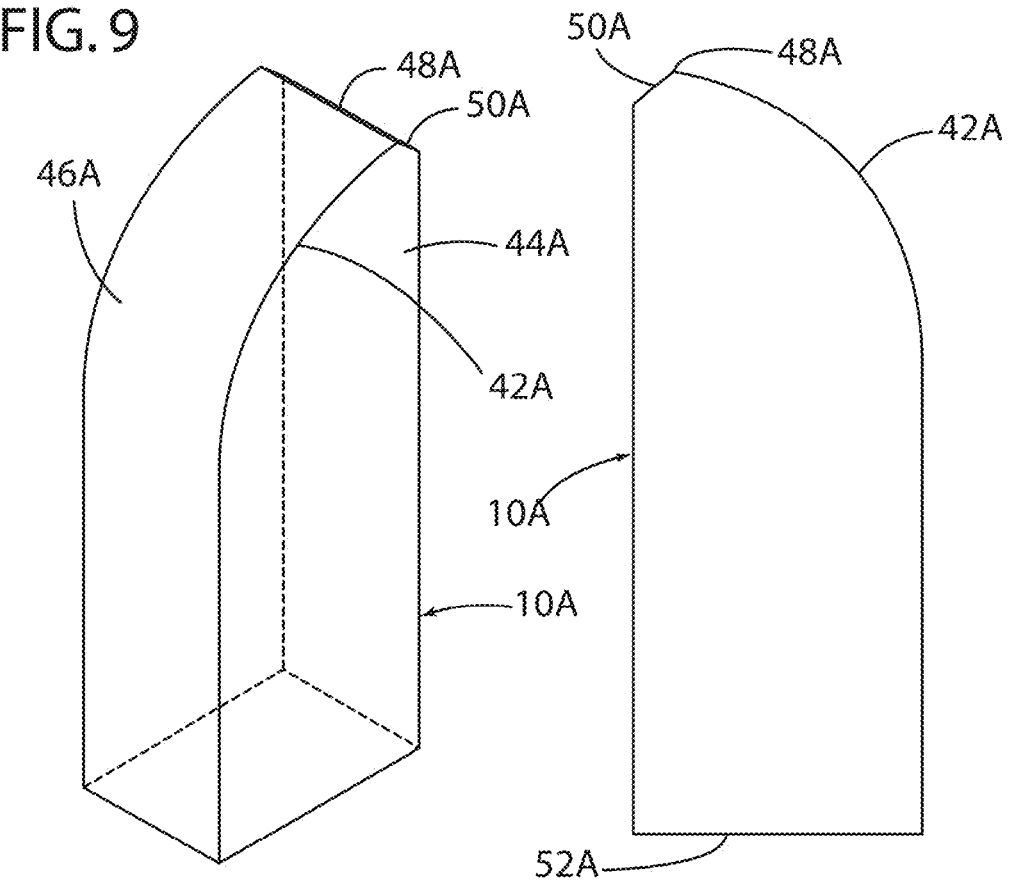
FIG. 9
FIG. 10
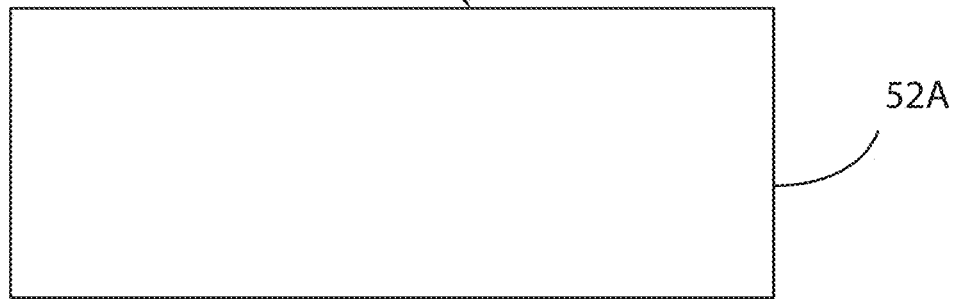
FIG. 11
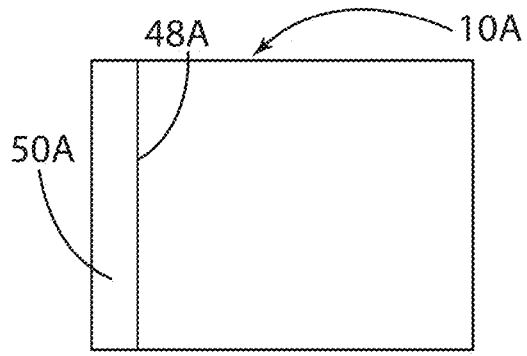
FIG. 12

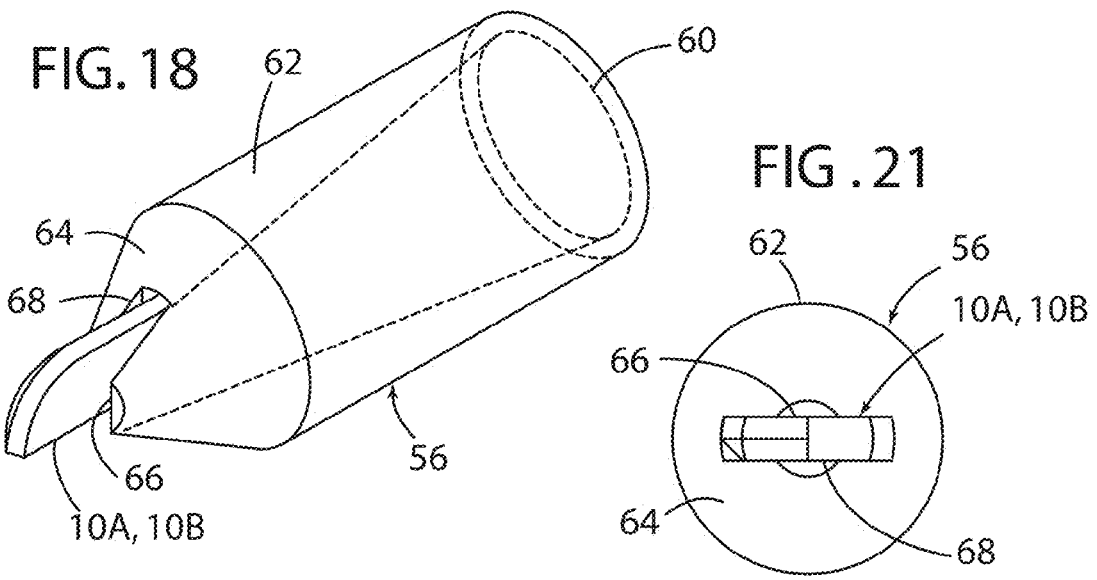
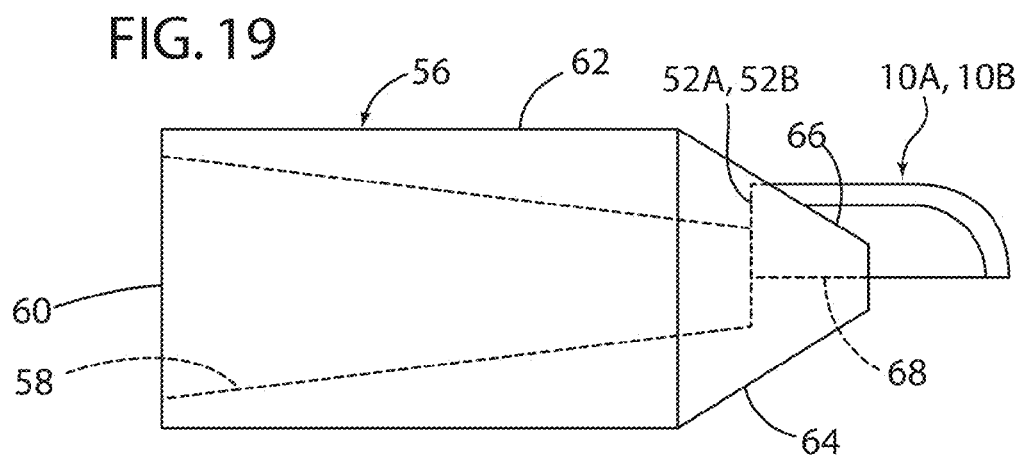
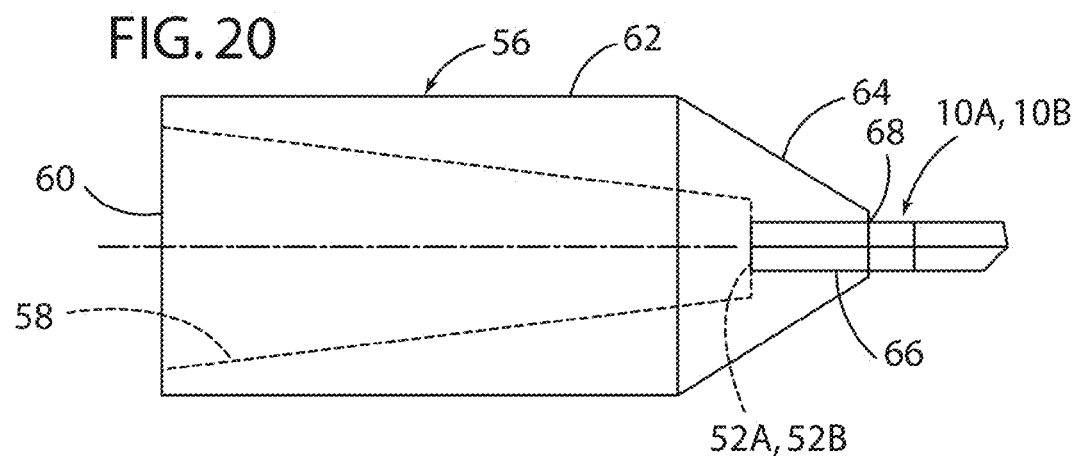

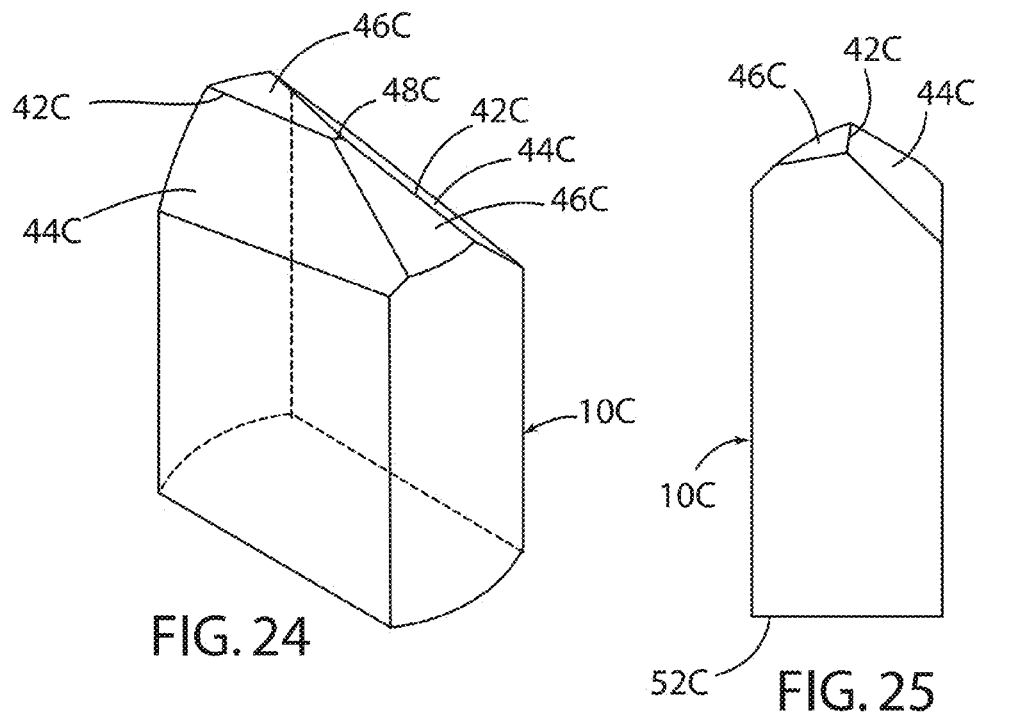
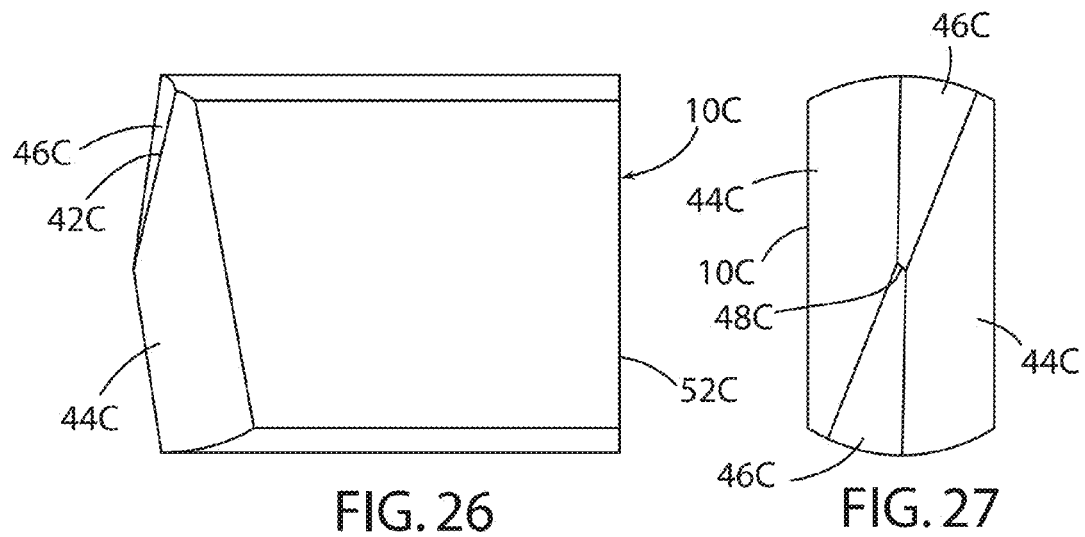

LASER AUGMENTED DIAMOND DRILLING APPARATUS AND METHOD

CROSS REFERENCE TO RELATED APPLICATION

This application claims the benefit of U.S. Provisional Application No. 62/248,863 filed on Oct. 30, 2015, entitled, "LASER AUGMENTED DIAMOND DRILLING APPARATUS AND METHOD," the entire contents of which are incorporated herein by reference.

BACKGROUND OF THE INVENTION

Drilling technology may involve various techniques and processes depending upon the material being drilled, accuracy requirements, size of the hole being drilled etc. Existing micro drilling techniques may be utilized to form various types of holes, including micro-holes. Known techniques include conventional mechanical drilling, micro-electrical discharge machining (micro-EDM), laser, photo-etching, ultrasonic and micro-electrical chemical machining (micro-ECM), etc.

BRIEF SUMMARY OF THE INVENTION

One aspect of the present invention is a method of drilling utilizing a laser which is focused through a hard light-transmitting material (e.g. diamond) to a tip (cutting edge) of a tool to thermally soften hard and brittle materials during a drilling process.

Previous research has demonstrated that ductile mode machining of semiconductors and ceramics is possible due to the occurrence of high pressure phase transformation (HPPT) in the material. A laser augmented drilling system according to the present invention may be used to preferentially heat and thermally soften a workpiece material in contact with a diamond cutting tool. This heating and softening may include HPPT in materials such as semiconductors and ceramics. However, in the case of composites and other materials, HPPT may not occur. Laser augmented drilling according to the present disclosure may nevertheless be utilized in various non-HPPT materials. In materials that do not experience HPPT during laser augmented drilling, the material (in its natural or native, atmospheric state), needs only to absorb the incident laser radiation wavelength. In the case of composites, the materials are typically not transparent to the laser wavelength, like ceramics or semiconductors. Thus, the composite materials may absorb all or most of the laser energy. In a laser augmented drilling system/method according to the present invention, a laser and diamond cutting tool may be integrated into a single package. In this system/method, the laser energy is delivered by a fiber to and through a diamond cutting tool. A lens system may be utilized to focus/shape the laser beam so that the laser beam has a non-circular cross sectional shape corresponding to the cutting edge (or edges) of the diamond cutting tool. A system/method according to the present invention may increase the critical depth of cut (DoC) to provide a larger ductile-to-brittle transition (DBT) depth in ductile regime machining to thereby provide a higher material removal rate.

During laser augmented drilling operations as disclosed herein, the diamond contact and resultant pressure on the material being machined (e.g. drilled) may create a high pressure phase transformation (HPPT) (at room pressure and temperature), which lowers the hardness by converting the material from a covalent bond to a metallic bond. A ductile and plastic (softer) material results from the phase transformation. The present invention utilizes laser heating to lower the HPPT pressure to thereby create more HPPT at the same conditions (force, pressure).

However, as discussed above, it will be understood that laser augmented diamond drilling processes according to the present invention do not necessarily require HPPT, and the drilling processes of the present invention will work even if HPPT does not occur (e.g. in composite materials), or if HPPT occurs only partially. The tool/process of the present invention causes more softened and ductile material to form compared to conventional processes that do not utilize laser heating, or that utilize laser heating before or after drilling. Alternatively, utilizing laser heating permits use of a lower force on the tool to create a corresponding amount of HPPT material (compared to room/atmospheric temperature), leading to a reduced propensity for fracture, or an apparent decrease in brittleness and an increase in fracture toughness. Also, the laser heats and softens the HPPT material in situ, thereby providing enhanced ductility and plastic deformation. While the HPPT makes the material "softer" at room temperature (by rearrangement of the atomic structure into a new material and softer structure), the laser heating initially reduces the force/pressure needed to create this softened HPPT material. The laser then heats the HPPT material and provides thermal softening. This added "thermal" softening due to the laser heating is in addition to the original HPPT softening effect (due to force and pressure and atomic structure changer from covalent to metallic bonding).

As discussed in more detail below, the present invention utilizes a laser that is focused to transmit through a diamond drill bit that may have 1 or 2 cutting edges or more. A laser is focused to illuminate at least a portion (preferably the entirety) of the edge or edges of the diamond bit to thereby transmit laser energy to the work piece. The laser beam may be focused and/or directed so that it exits the diamond bit at the cutting edge and/or the rake face and/or the flank or clearance face. For example, the diamond bit may be configured such that the laser beam exits the bit simultaneously at the cutting edge, rake face, and flank faces. Also, the laser beam can be shaped/directed using suitable optical components (e.g. collimator and/or lenses) whereby the laser beam is (for example) elliptical or rectangular in cross section. The elliptical or rectangular laser beam can be directed onto/through a linear cutting edge of the diamond bit to heat material adjacent the cutting edge immediately prior to removal of the material. In general, the rake angle of a diamond bit according to the present invention may vary from positive to extremely negative, depending on the requirements of a particular application. The bit can also be tilted as required for a particular application.

The test set up described below demonstrates the technology with a single diamond crystal bit having only one edge. This single crystal/single edge drill bit of the test was formed using conventional grinding methods. A double-edged drill bit may be formed from a single diamond crystal or a poly crystal diamond (PCD). An ion-beam machining tool/process is preferably utilized to fabricate single and double edge diamond drill bits. Although conventional grinding processes may be utilized to form PCD drill bits, an ion-beam process is preferred if the drill bit comprises a single crystal diamond. An ion-beam process is also preferred if a diamond bit has a complicated geometry that cannot be formed utilizing conventional grinding processes or the like.

The system/process of the present invention may be utilized for drilling brittle materials such as ceramics, semiconductors, rocks, composites and ceramic matrix composites. As discussed above, high pressure phase transformation (HPPT) of the drilled material may occur when a material is drilled using a laser augmented diamond drilling process according to the present invention. Utilizing sufficient pressure, laser heating, etc. to cause HPPT may be advantageous in some applications because the phase transformation results in greater absorbance of laser energy by the material after the phase transformation. However, HPPT is not required, and laser heating and tool pressures resulting in thermal softening (without HPPT) may also be utilized. It will be understood that laser heating reduces the pressure needed to cause HPPT. Thus, the present invention may be utilized to provide HPPT in drilling processes at a lower pressure than would be required if no laser heating is used. Holes (bores) formed using a laser augmented system/process according to the present invention are of the expected size, and the sidewalls of the holes are smooth such that additional buffing (which could increase the diameter of the bore) is not required.

The present invention may utilize a relatively low power laser that only heats the material where the bit edge is pressing on the material to produce a localized thermal softening and/or phase transformation. The laser may comprise a green laser, or the laser may comprise an ultraviolet or infrared laser, or other suitable laser wavelengths. In contrast to known laser assisted machining (LAM) devices/processes, the present disclosure provides a laser beam that is pointed in a direction that is parallel (or approximately parallel) to the axis of rotation of the diamond drill bit. The co-axial alignment of the laser beam, drill bit and cutting (drilling) direction provides increased efficiency for the drilling process and reduced pressure required on the drill bit. Due to the alignment of the laser beam, the heat generated from the laser source (location and concentration) is of greater benefit (beneficial) for the drilling operation. Also, the alignment of the laser and drilling direction applies the heat where it is most beneficial (along the axis of the drill direction). Less laser power is needed compared to known LAM processes because the laser heating is at the same spot (co-axial) during the process. The laser decreases the pressure needed to cause a phase transformation and/or cause thermal softening of the material to provide ductile mode drilling. The laser augmented drilling system/process of the present invention also reduces wear on the drill bit due to the reduced pressure. Cutting fluids can be utilized in the system/process of the present invention. In general, cutting fluids do not interfere with the effectiveness of the laser beam. The invention may be utilized to drill materials such as tooth, bone, and gem stones. The invention may also be utilized for drilling bedrock in connection with oil and gas drilling operations and the like.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a schematic drawing of a laser augmented diamond drilling system/process according to one aspect of the present invention;

FIG. 1A is an enlarged cross sectional view of a portion of the drill bit of FIG. 1;

FIG. 2 is an isometric view of a laser augmented diamond drilling system;

FIG. 9 is an isometric view of a diamond drill bit according to one aspect of the present invention;

FIG. 10 is a side elevational view of the diamond drill bit of FIG. 9;

FIG. 11 is a side view of the diamond drill bit of FIG. 9;

FIG. 12 is an end view of the diamond drill bit of FIG. 9;

FIG. 18 is an isometric view of a shank and diamond drill bit assembly according to one aspect of the present invention;

FIG. 19 is a side view of the shank and diamond drill bit of FIG. 18;

FIG. 20 is a side view of the shank and diamond drill bit of FIG. 18;

FIG. 21 is an end view of the shank and diamond drill bit of FIG. 18;

FIG. 24 is an isometric view of a diamond drill bit according to another aspect of the present invention;

FIG. 25 is side view of the diamond drill bit of FIG. 24;

FIG. 26 is a side view of the diamond drill bit of FIG. 24;

FIG. 27 is an end view of the diamond drill bit of FIG. 24;

DETAILED DESCRIPTION

Figure 3:
FIG. 3 is an image of a whole wall surface generated utilizing a microscope.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

This application is related to U.S. Pat. No. 8,933,366, the entire contents of which are incorporated herein by reference.

Some micro drilling applications involve high quality materials that are mechanically harder. However, such materials may need to be manufactured with a high level precision and accuracy. Drilling brittle and hard materials such as ceramics and semiconductors to produce holes that are free of fractures, surface and subsurface damage and cracks and micro-cracks, with good edges and high surface quality, may be a challenge due to the low fracture toughness of these materials. Severe fracture may occur during drilling operations due to the low fracture toughness of these materials. For example silicon has a fracture toughness of 0.83 to 0.95 MPa·m$^{0.5}$, depending on the crystal orientation.

With reference to FIG. 1, in a laser augmented diamond drilling (LADD) system/process 1 according to one aspect of the present invention, a laser beam from laser source 6 is transmitted through an optical fiber 8 and through an optically transparent diamond drill bit 10. The laser beam is focused precisely at a tool-workpiece interface 12 (FIG. 1A) at which drill bit 10 contacts the material of workpiece 14. Thus, the diamond bit 10 is a cutting tool and it is also an optical component of the system 1. At interface 12 the material of workpiece 14 is under high pressure induced by the diamond drill bit 10. This pressure may be high enough to cause HPPT. The laser beam softens the material of workpiece 14 under the tool 10 at interface 12, thereby reducing the cutting forces needed to cause HPPT and/or to remove material, and therefore reducing tool wear. Less cutting force also decreases damage to the workpiece, decreases clamping force needed to hold the workpiece, and decreases rigidity that is needed for the drilling equipment. A laser augmented diamond drilling system/process according to the present invention may be utilized to drill a single crystal silicon (100) material that is very brittle and difficult to drill using conventional methods. Effects of using a laser on process outputs such as edge quality, surface roughness of the wall of drilled holes and brittle or ductile mode of the machined surfaces are discussed below.

Example

An infrared (IR) continuous wave (CW) fiber laser 6 (FIG. 1) with wavelength of 1070 nm and max. power of 100 W was utilized in a test set up in accordance with one aspect of the present invention. Testing was conducted both with and without laser assistance to determine the effects of the laser 6. A single edge diamond drilling bit 10 with a 1 mm radius with −45° rake and 5° clearance angle was used for this drilling operation. A Universal Micro Tribometer (UMT) manufactured by CETR-Bruker Inc. was modified and coupled to the laser augmented diamond drilling (LADD) system 1 to perform the drilling tests.

It will be understood that other lasers may be utilized according to other aspects of the present invention. For example, a green laser having a wavelength of about 532 nm and a power of about 200 W may also be utilized. In general, the wavelength of the laser may be selected based, at least in part, on the type of material being machined. Some materials absorb more laser energy (i.e. higher percentage of the energy incident on the material) if the wavelength of the laser beam falls within a specific frequency range. For example, the HPPT phase of silicon absorbs more energy at around 532 nm (green) than around 1070 nm (IR laser). Thus, although an IR laser is utilized in the following example, it will be understood that this is not necessarily the preferred wavelength for all applications/materials. Also, a continuous wave (CW) laser is presently preferred to provide constant heating of the material being machined. In general, a CW laser provides constant heating that thermally softens the material being drilled to permit plastic/ductile deformation of the material without spalling. However, pulsed lasers may also be utilized if required for a particular application.

FIG. 2 shows the experimental setup used for performing the tests. In this setup, the sample (workpiece 14) rotates instead of the drill bit 10. As discussed in more detail below the present invention may, alternatively, utilize drilling operations in which the drill bit 10 rotates, and the workpiece 14 remains stationary. For the test setup of FIG. 2, a sample workpiece 14 is mounted on a precise air bearing spindle 18. An electric motor 22 is operably connected to spindle 18 by pulleys 24A, 24B, and belt 26. Thus, actuation of electric motor 22 causes rotation of spindle 18 and test workpiece 14. Before each test, as the sample workpiece 14 is rotating, the drill bit 10 is preferably moved to the center of the spindle 18, and the sample workpiece 14 is preferably mounted at that position to avoid inaccuracy. In the test set up of FIG. 2 a laser collimator 32 may be utilized to align the laser beam by moving or tilting laser collimator 32 vertically and/or horizontally. A vertical linear stage or actuator 36 may be operably connected to a tool head assembly 40 to raise and lower the laser augmented diamond drilling (LADD) system, including diamond drill bit 10. A load cell 28 may be utilized to measure the force exerted on the drill bit 10 by the actuator 36. It will be understood that the vertical linear stage/actuator 36 may comprise a powered actuator or vertical linear stage that is operably connected to a controller (not shown). Alternatively, vertical linear stage actuator 36 may comprise a manually-actuated component that is used to manually raise and lower the diamond drill bit 10 and to exert force on the diamond drill bit 10. A camera 38 having a magnifying lens assembly 39 may be utilized to visually monitor the drilling operation utilizing a video screen (not shown) or the like that is operably connected to the camera 38.

Testing of micro drilling silicon by a diamond coated drill bit utilizing the test setup of FIG. 2 showed that ductile mode cutting (FIG. 3) can be achieved provided the feed rate is less than a critical value. This critical value of the feed rate can be determined by increasing the infeed rate, followed by checking the hole under a microscope after each test. This process is repeated holding all variables (e.g. drill RPM) except the feed rate constant until ductile to brittle mode transition starts. Increasing feed rates beyond the critical value results in brittle mode cutting. The critical value depends on chip thickness and other parameters such as thrust load or pressure. The white areas on the surface (wall) of the hole in FIG. 3 are machined in ductile mode while the dark areas are the result of brittle mode cutting. These dark areas are pits and fractures that occurred during the drilling process. These defects may initiate more cracks and potentially cause failure of the final part. Thus, an ideal machined hole in a brittle material has minimal brittle mode cutting. Although face machining (polishing/turning) of a brittle material is possible to remove unwanted surface and subsurface damage, drilling is preferably a final process. Thus, a process according to the present invention in which unwanted effects on the material are minimized or eliminated is beneficial.

Figure 4:
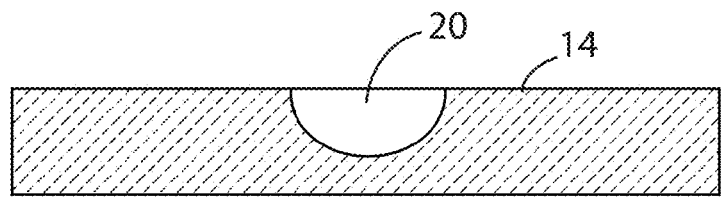
FIG. 4 is a schematic drawing of a dimple-shaped hole in a material.

Due to low fracture toughness of brittle materials, fracture may occur when such materials are under tensile stress. Therefore entrance and especially exit of a through hole are very important as tensile stresses are much higher than compressive stresses in these zones, particularly the latter. The testing described herein is focused on the benefits of using a laser drilling process, and the wall surface roughness and edge quality of the hole entrance produced by this process. A dimple-shaped hole 20 (FIG. 4) was drilled in a silicon sample 14 for each test.

Figure 5:
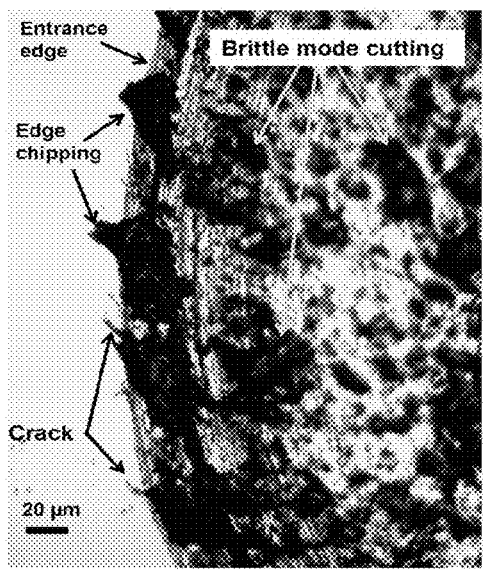
FIG. 5 is an image of an entrance and wall of a hole drilled with no laser.

The spindle RPM for this testing was 350. For each cut, both with a laser and with no laser, load was kept at about 80 g, and the tool (drill bit 10) was fed continuously to reach a 150 micron depth. For the first test, the sample 14 was drilled with no laser to establish a baseline. FIG. 5 shows the edge and wall of a hole drilled in a sample 14 with no laser. Edge chipping, cracks and brittle mode (in some areas ductile mode) cutting can clearly can be observed. Testing showed that it is possible to lower the feed rate of drill bit 10 to provide a better surface finish. However, the sample 14 was intentionally drilled in an aggressive manner to demonstrate that a laser can help to increase the ductility of the material and decrease the damages at a given feed rate.

Surface roughness parameters (Ra and Rz) of the hole inner surface were measured with a white light interferometer (WYKO). Due to brittle mode cut and the fractures that occurred during the process (FIG. 5), the surface was relatively rough with Ra of 602 nm and Rz of 5.58 µm. Many cracks formed at the entrance of the hole due to tensile stresses generated during the process. These cracks may propagate later, and are therefore undesirable.

Figure 6:
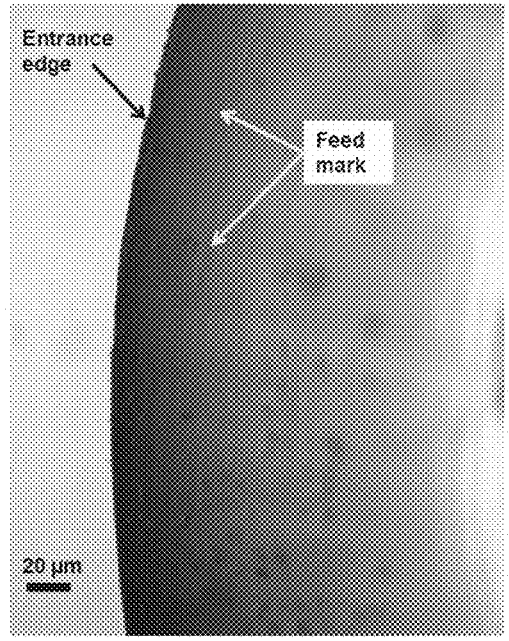
FIG. 6 is an image of an entrance and wall of a hole drilled using a laser.

For the next test a new silicon sample 14 was drilled with the aid of a laser. 10 W laser power was used for the laser-assisted testing. However, due to reflection, absorption, error of the laser, and scattering, the actual laser output was less than 4 W. In order to retain the same conditions for both tests, the same setup (FIG. 2) was used, and the only difference was the use of a laser. Specifically, the same load, feed rate and other parameters were used in the laser-assisted test as the no laser test. The resulting entrance edge and the wall of the hole for the laser-assisted test is shown in FIG. 6. The quality of the edge is clearly much better in the laser-assisted hole compared to the hole drilled with no laser (FIG. 5). Drilling was in ductile mode with almost no sign of fracture. Feed marks also can be seen, and the surface is clearly smoother than the case with no laser. The Ra and Rz obtained for this surface were 44 nm and 445 nm, respectively. No sign of chipping, crack or fracture can be seen on the edge and the wall. In fact, the laser helped to decrease the brittleness of the material especially at the entrance edge, at which tensile stress is high.

Figure 7:
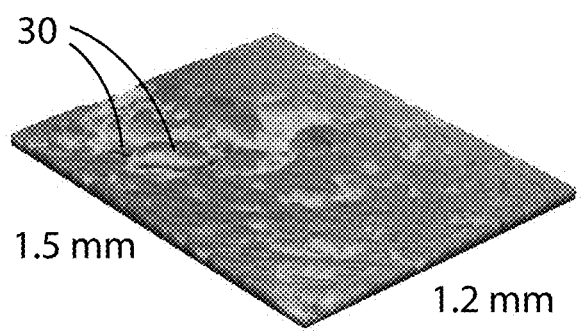
FIG. 7 is a 3D image of the inner wall of a hole drilled with no laser.
Figure 8:
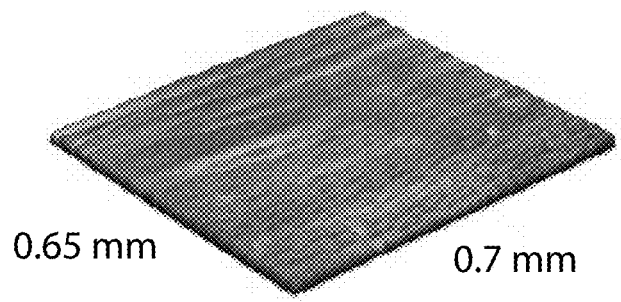
FIG. 8 is a 3D image of an inner wall of a hole drilled with a laser augmented diamond drilling process.

In order to help visualize the obtained surfaces, a three dimensional (3D) profile of the inner surface of the hole was generated by the WYKO profiler for each test. A 3D drilled whole wall produced by drilling without laser assist is shown in FIG. 7. The 3D profile is intentionally flattened by the software to be able to see the features on the surface. The lower areas 30 in FIG. 7 are pits caused by brittle mode cutting. The 3D profile of the silicon sample drilled with laser assist (FIG. 8) shows the feed marks and very minimal imperfections on the surface.

Figure 13:
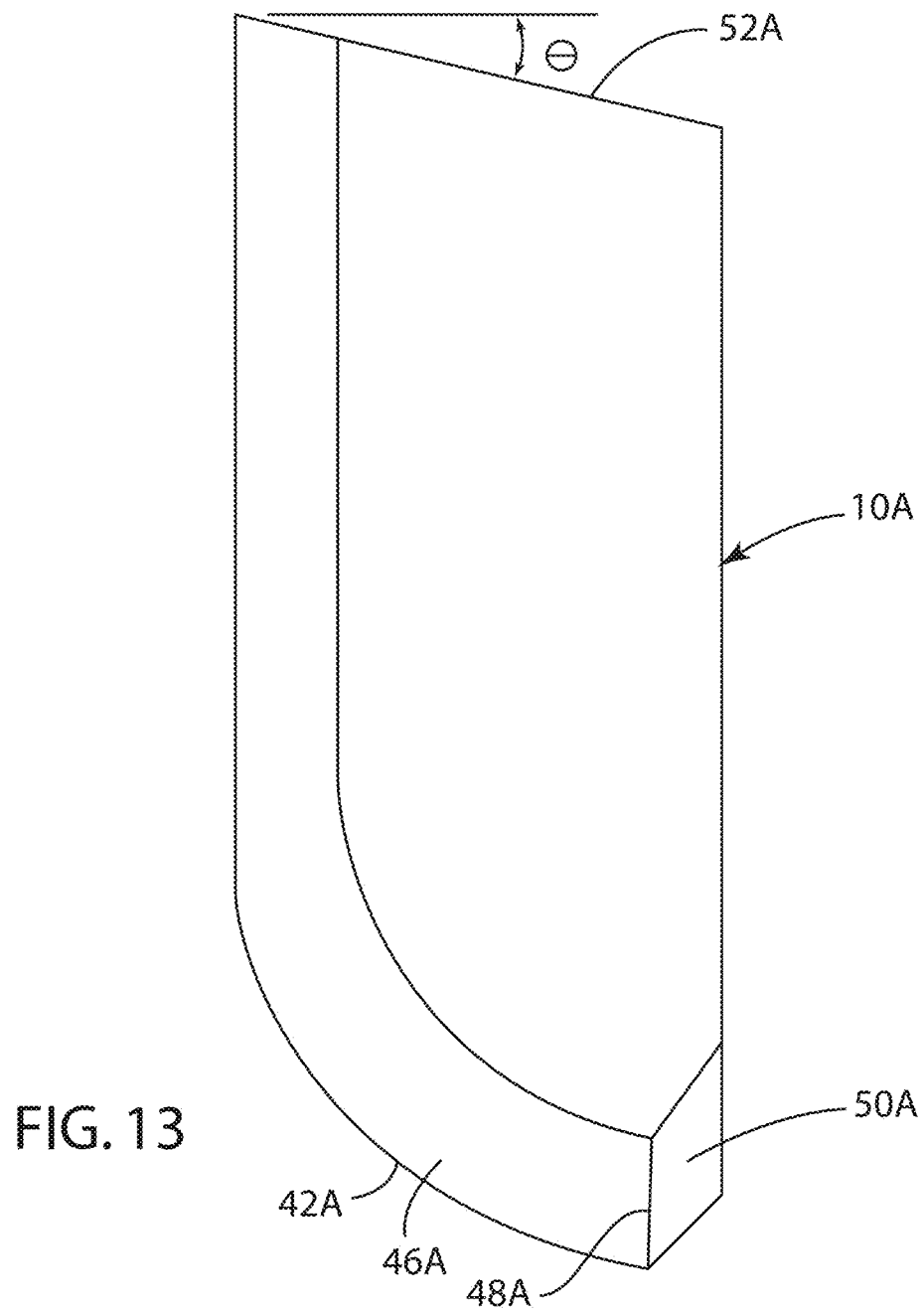
FIG. 13 is a side view of the diamond drill bit of FIG. 9.
Figure 14:
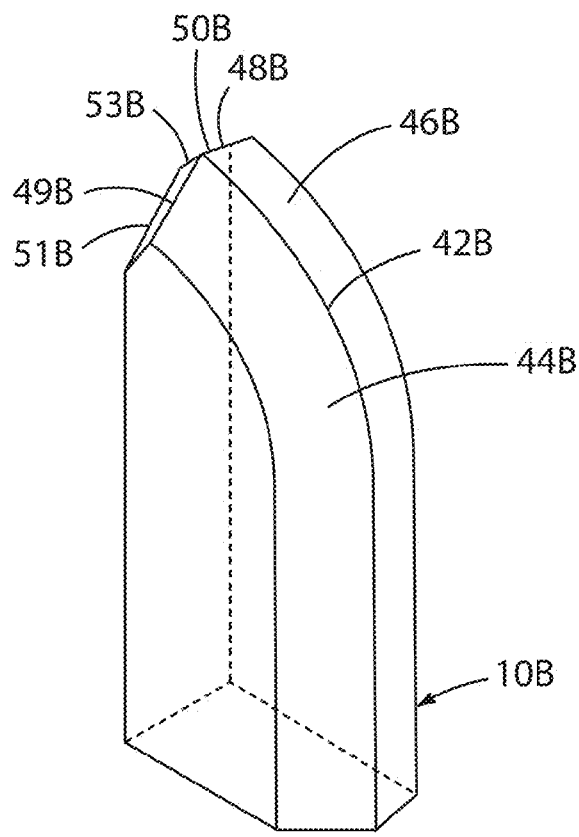
FIG. 14 is an isometric view of a diamond drill bit according to another aspect of the present invention.
Figure 15:
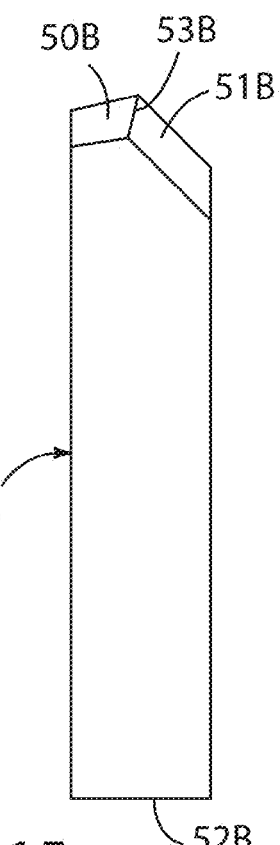
FIG. 15 is a side view of the diamond drill bit of FIG. 14.
Figure 16:
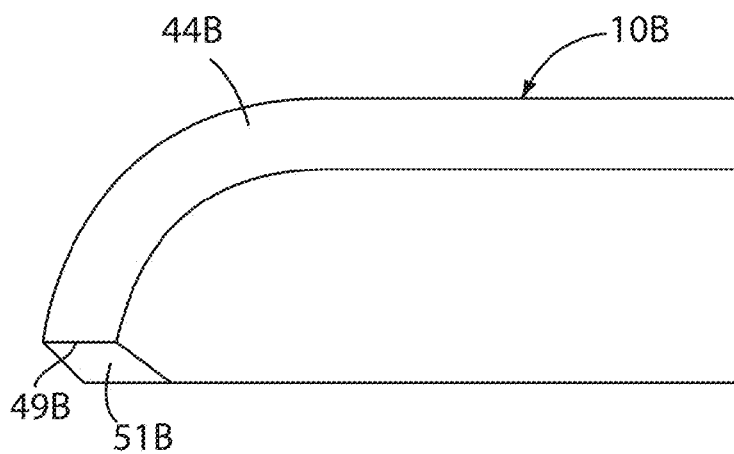
FIG. 16 is a side view of the diamond drill bit of FIG. 14.
Figure 17:
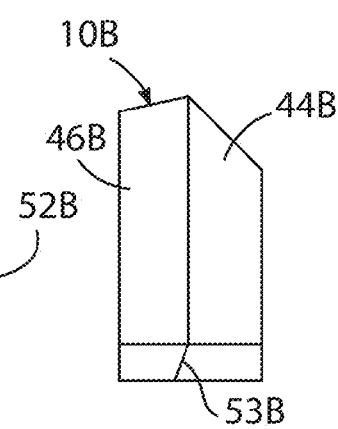
FIG. 17 is an end view of the diamond drill bit of FIG. 14.

With reference to FIGS. 9-12, a diamond drill bit 10A according to one aspect of the present invention includes a cutting edge 42A formed along an intersection of a rake face 44A and a flank face 46A. An end edge 48A is formed at the intersection of end surface 50A and flank face 46A. Drill bit 10A may comprise a single diamond crystal, or it may comprise a poly crystal diamond (PCD). Drill bit 10A may be formed using a conventional grinding process. Alternatively, an ion-beam machining process may be used to form the drill bit 10A if the geometry is too complicated for conventional grinding processes. In use, drill bit 10A is rotated, thereby causing cutting edge 42A to remove material. In general, the material being removed contacts rake face 44A. The flank face 46A may be formed at 90° relative to rake face 44A. Alternatively, flank face 46A may be oriented at less than 90° relative to rake face 44A to provide a relief angle. It will be understood that the size and/or geometry of drill bit 10A may vary depending upon the material to be drilled, the size of the hole to be drilled, and other such factors. In use, a laser beam is directed at the end surface 52A, and focused at the cutting edge 42A. As discussed above, the laser heats the material, thereby softening the material and assisting the drilling process. It will be understood that the drill bit 10A is preferably made of a translucent or transparent diamond material that readily transmits the laser light through the drill bit 10A. With further reference to FIG. 13, end surface 52A may be formed to provide a back angle θ, and the end surface 52A may be coated with an anti-reflective coating.

With further reference to FIGS. 14-17, a diamond drill bit 10B according to another aspect of the present invention includes a cutting edge 42B, a rake face 44B, and a flank face 46B. The drill bit 10B also includes an end edge 48B, an end edge 49B, a first end surface 50B, and a second end surface 51B. The diamond drill bit 10B further includes an end surface 52B and a tip or end edge 53B formed by the intersection of surfaces 50B and 51B. In use, a laser beam is directed onto the surface 52B and focused at the cutting edge 42B. The diamond drill bit 10B may be formed from a single crystal diamond material, or a poly crystal diamond material.

With further reference to FIGS. 18-20, the diamond drill bits 10A and 10B may be mounted in a shank 56 having a passageway or tapered bore 58. In use, a laser beam is directed into the open end 60 of passageway 58, and the laser beam is directed towards the end surface 52A or 52B of diamond drill bit 10A or 10B. In the illustrated example, the shank 56 has a cylindrical outer surface portion 62, and a conical surface portion 64. However, it will be understood that the shank 56 may have other configurations/geometries as required for a particular application. A hole 60 in shank 56 includes retaining surfaces 66 and 68 that engage and retain diamond drill bit 10A or 10B. The diamond drill bit 10A or 10B may be bonded or otherwise secured to the shank 56.

Figure 22:
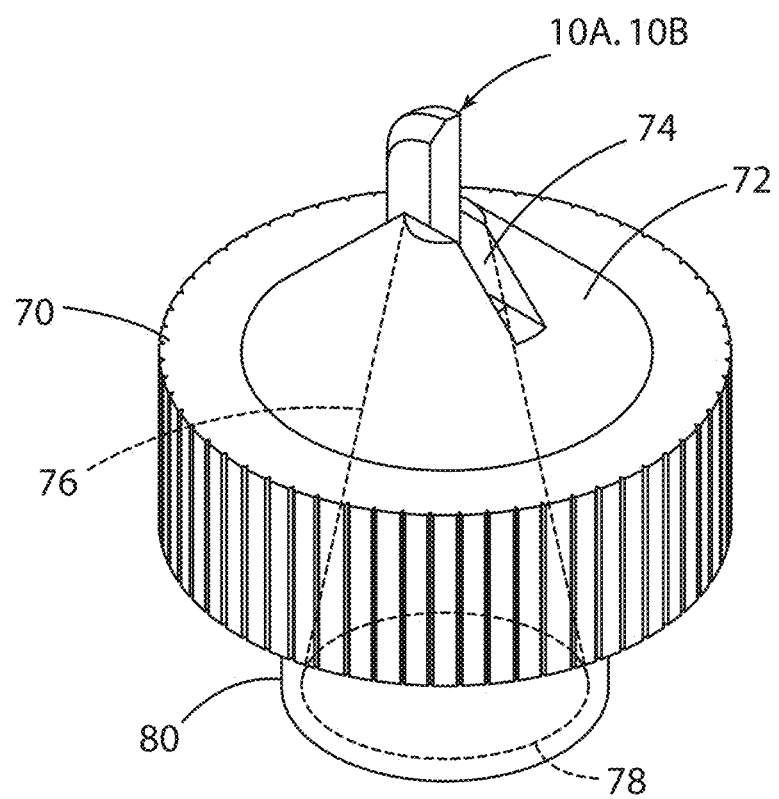
FIG. 22 is an isometric view of a nozzle and diamond drill bit according to another aspect of the present invention.
Figure 23:
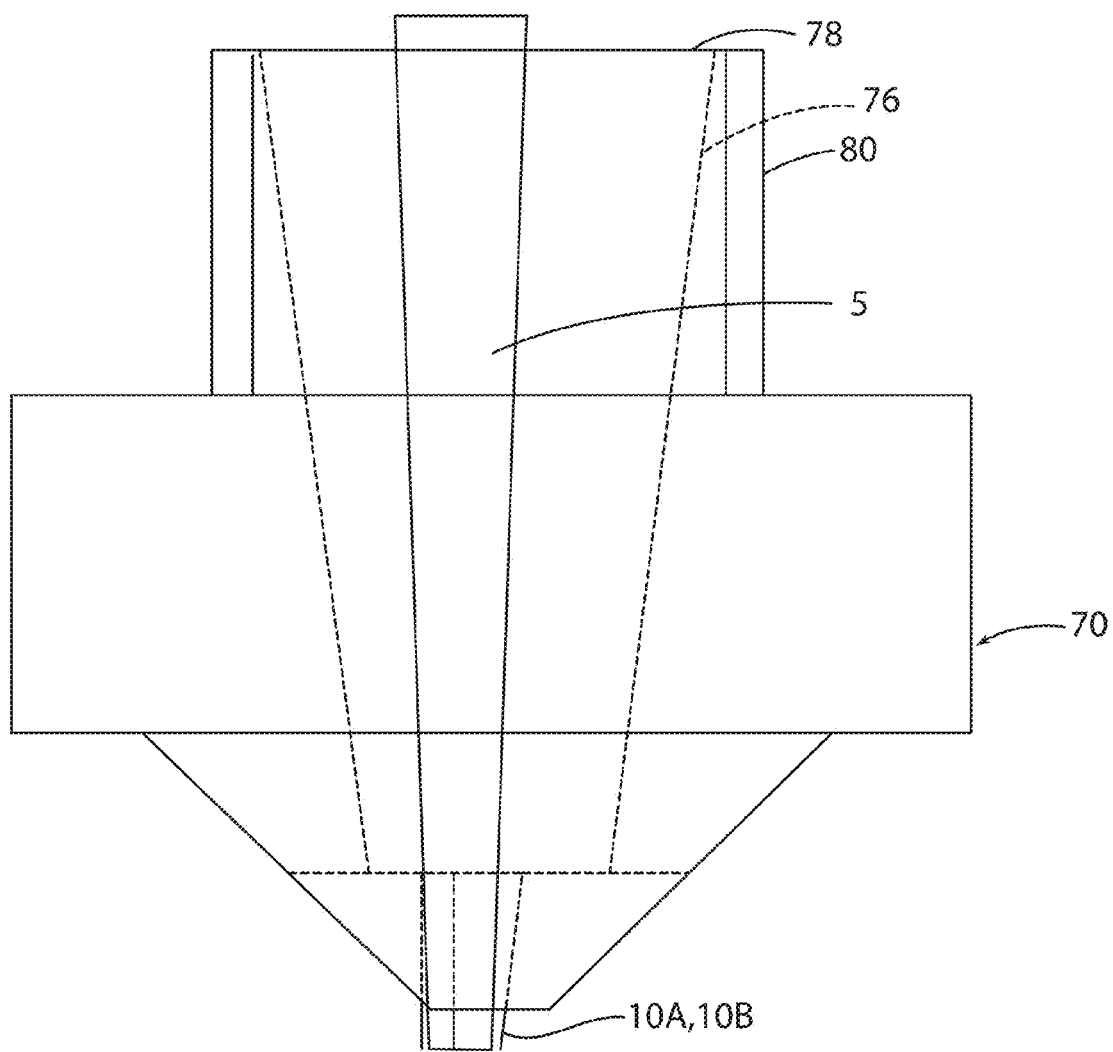
FIG. 23 is a partially schematic side view of the nozzle and diamond drill bit of FIG. 22.
Figure 28:
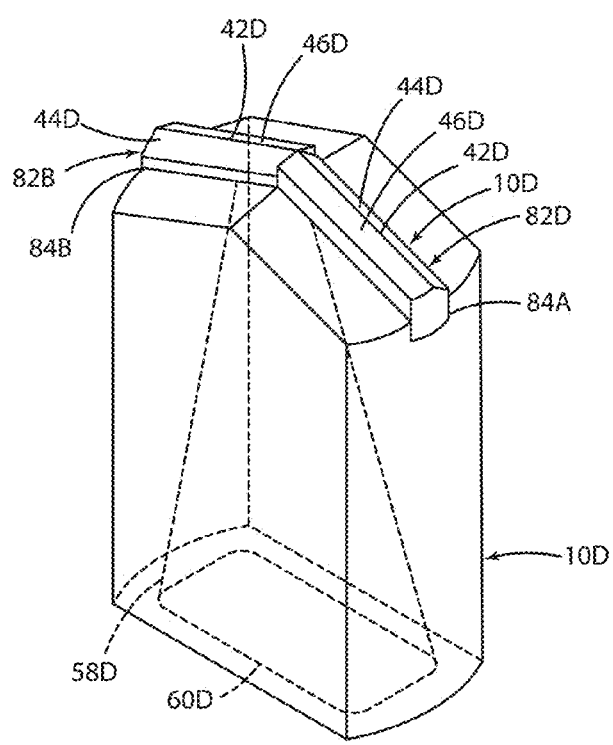
FIG. 28 is an isometric view of diamond drill bit and shank according to another aspect of the invention.
Figure 29:
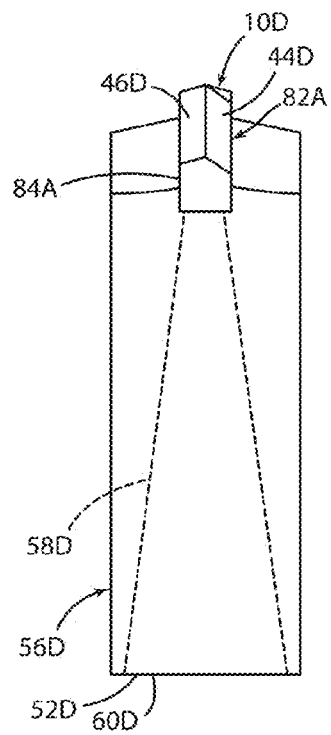
FIG. 29 is a side view of the diamond drill bit and shank of FIG. 28.
Figure 30:
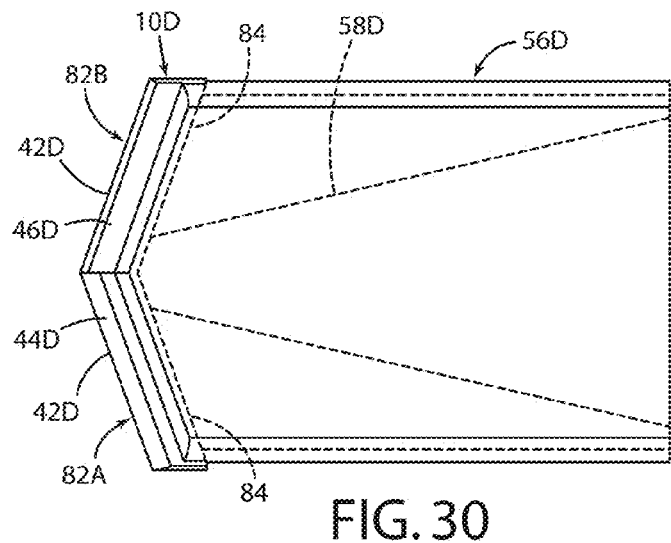
FIG. 30 is a side view of the diamond drill bit and shank of FIG. 28.
Figure 31:
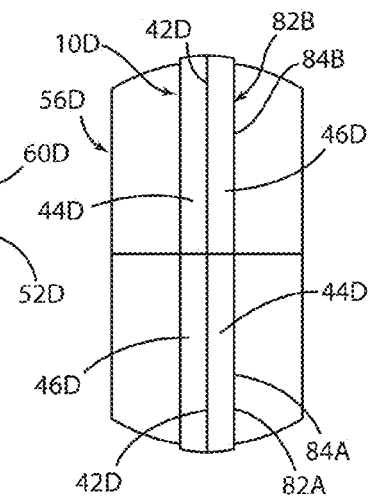
FIG. 31 is an end view of the diamond drill bit and shank of FIG. 28.

With reference to FIGS. 22 and 23, diamond drill bits 10A or 10B may be mounted in a nozzle 70 rather than a shank 56. Nozzle 70 includes a conical surface portion 72 and an opening/retaining structure 74 that retains the drills 10A or 10B. The nozzle 70 may include a conical internal passageway 76 forming an open end 78 that receives laser light that is focused on the diamond bit 10A or 10B. End portion 80 of shank 70 may be configured to mount the nozzle 70 in a tool holder or chuck.

With further reference to FIGS. 24-27, a diamond drill bit 10C according to another aspect of the present invention includes a pair of cutting edges 42C, a pair of rake faces 44C, and a pair of flank faces 46C. A chisel edge 48C is formed at the intersection of the two flank faces 46C. The drill bit 10C may also be mounted in a shank 56 as described above in connection with FIGS. 18-20, or a nozzle 70 as discussed above in connection with FIGS. 22 and 23. In use, a laser beam is directed to the end surface 52C and focused on the cutting edges 42C to thereby heat the material being machined/drilled.

With further reference to FIGS. 28-31, a diamond drill bit 10D according to another aspect of the present invention includes first and second diamonds 82A and 82B, respectively, that are mounted in grooves 84A, 84B, respectively, of a shank 56D. The diamonds 82A and 82B include cutting edges 42D, rake faces 44D, and flank faces 46D. The shank 56D includes a conical inner passageway 58D having an open end 60D that receives a laser beam 5 that is focused on the cutting edges 42D.

Figure 32:
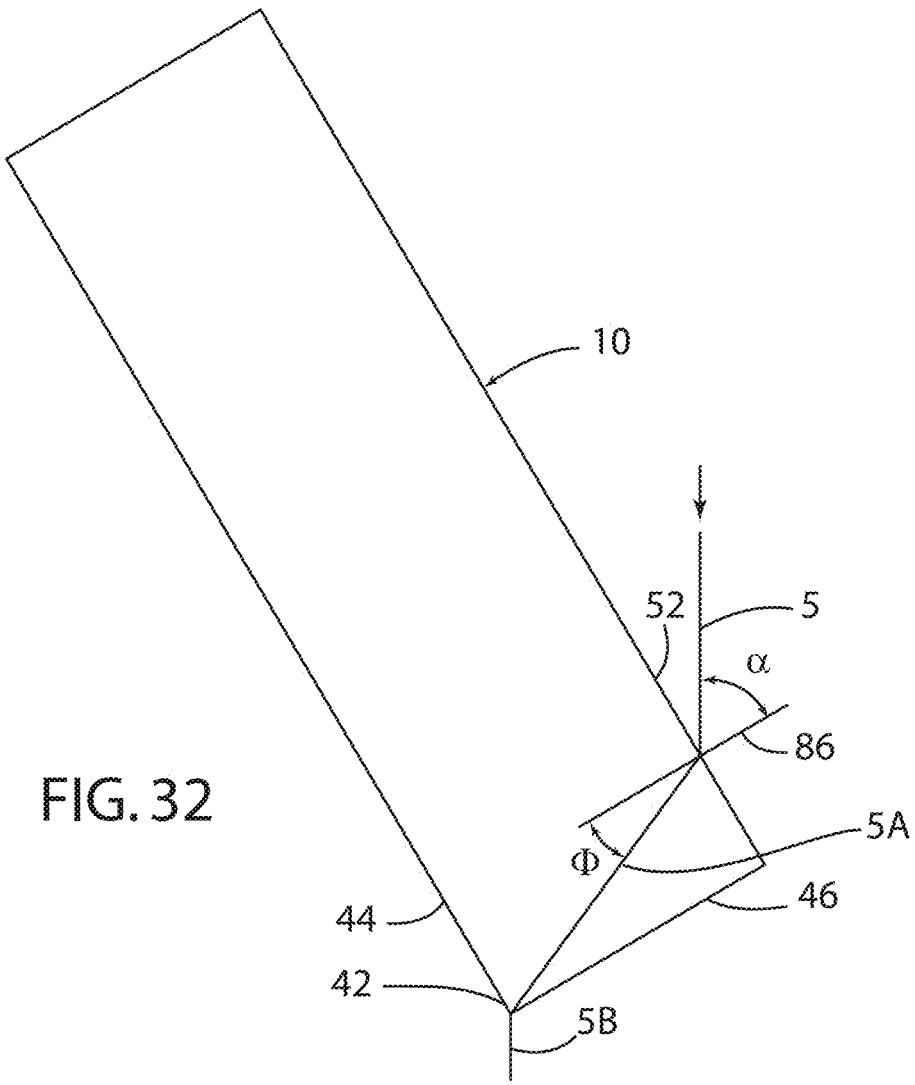
FIG. 32 is a schematic view of a diamond drill bit showing refraction of a laser beam whereby the laser beam is focused on the cutting edge of a diamond bit.

FIG. 32 is a schematic view showing refraction of a laser beam 5 within a diamond drill bit 10. The laser beam 5 is directed towards a surface 52 of diamond bit 10. It will be understood that the diamond bit 10 of FIG. 32 may comprise any of the diamond bits described herein, or it may comprise a diamond bit having a different configuration/shape as may be required for a particular application. In use, the laser beam 5 is directed towards a surface 52 of diamond bit 10. The surface 52 may be coated with a non-reflective material as discussed above. The laser beam 5 forms an angle α relative to a line 86 that is normal to the surface 52. The beam is then refracted internally within the diamond bit 10 at an angle φ, and the laser beam travels at an angle as designated 5A through the diamond bit 10. The laser beam 5A is focused on the cutting edge 42, and exits the diamond bit 10 at cutting edge 42 as shown by the laser beam segment 5B. Thus, the optical properties of the diamond material can be utilized to provide alignment and optimize the process. The optical transmission, refraction, and reflection can be used for this purpose.

Laser beam location and laser beam shaping may be utilized in connection with the diamond drill bits disclosed herein. In particular, the beam can be shaped to heat the diameter (surface) of the drilled hole (OD) to impact the resultant process. Shaping the laser beam to favor heating the OD (compared to other configurations) results in additional concentration of the heating effect at the finished surface of the hole. The beam can also be shaped (focused and lengthened with an ellipse or a rectangular shape) along the length of the drill bit cutting edge as described above. Laser heating can be different along the cutting edge depending on its function. For example, increased laser heating can be utilized at the center of the tip of the drill bit to make the material being drilled as soft as possible to thereby improve the drilling efficiency and/or speed. Additional heating at the edge improves the hole quality by reducing cracking and chipping.

Figure 33:
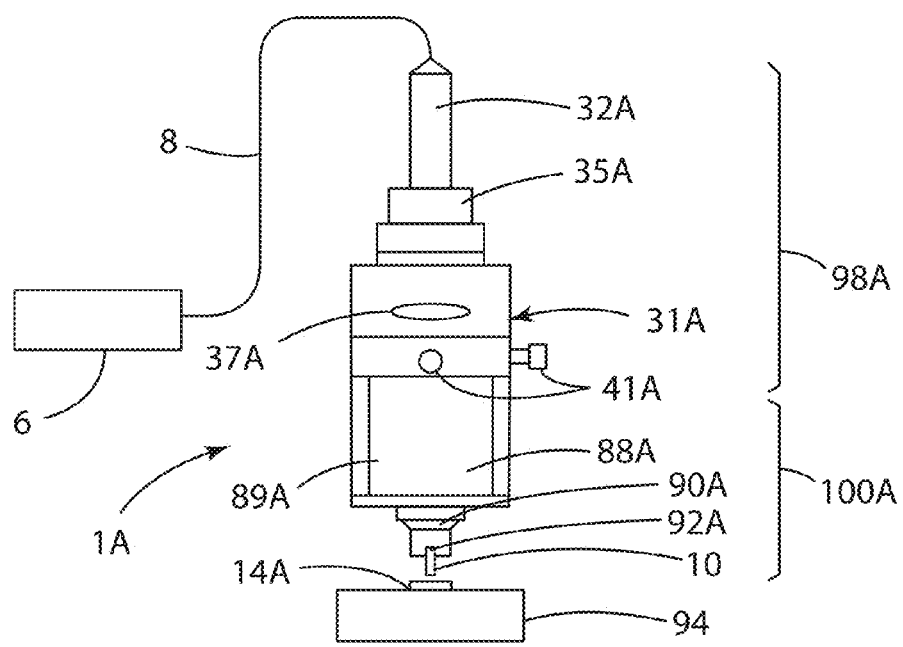
FIG. 33 is a schematic drawing of a tooling setup according to another aspect of the present disclosure.
Figure 34:
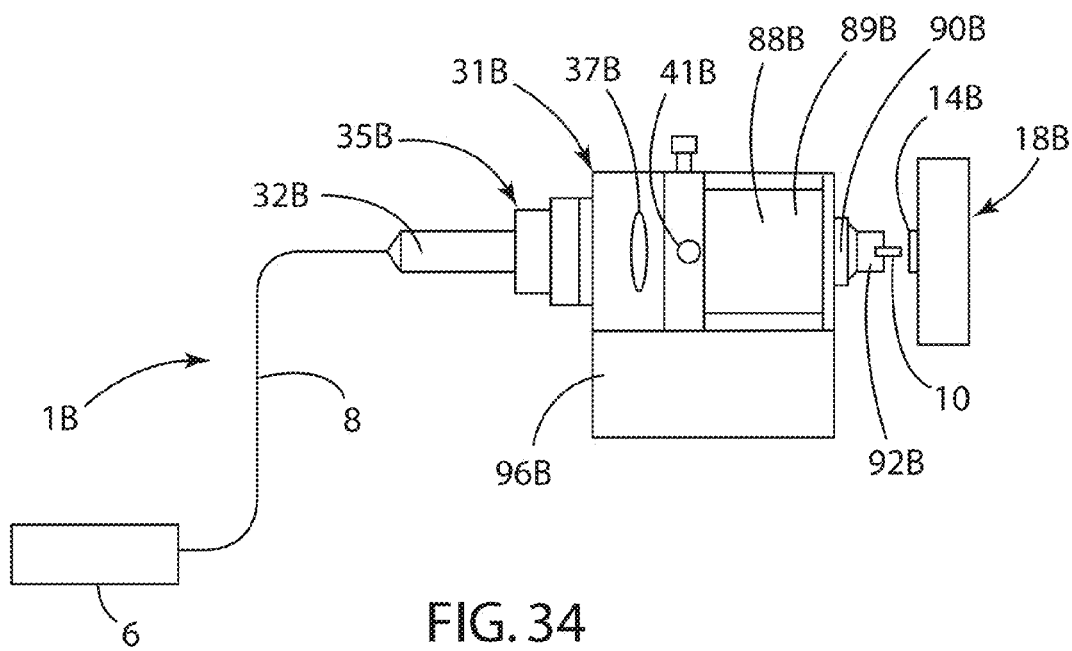
FIG. 34 is a schematic drawing of a tooling setup according to another aspect of the present disclosure.
Figure 35:
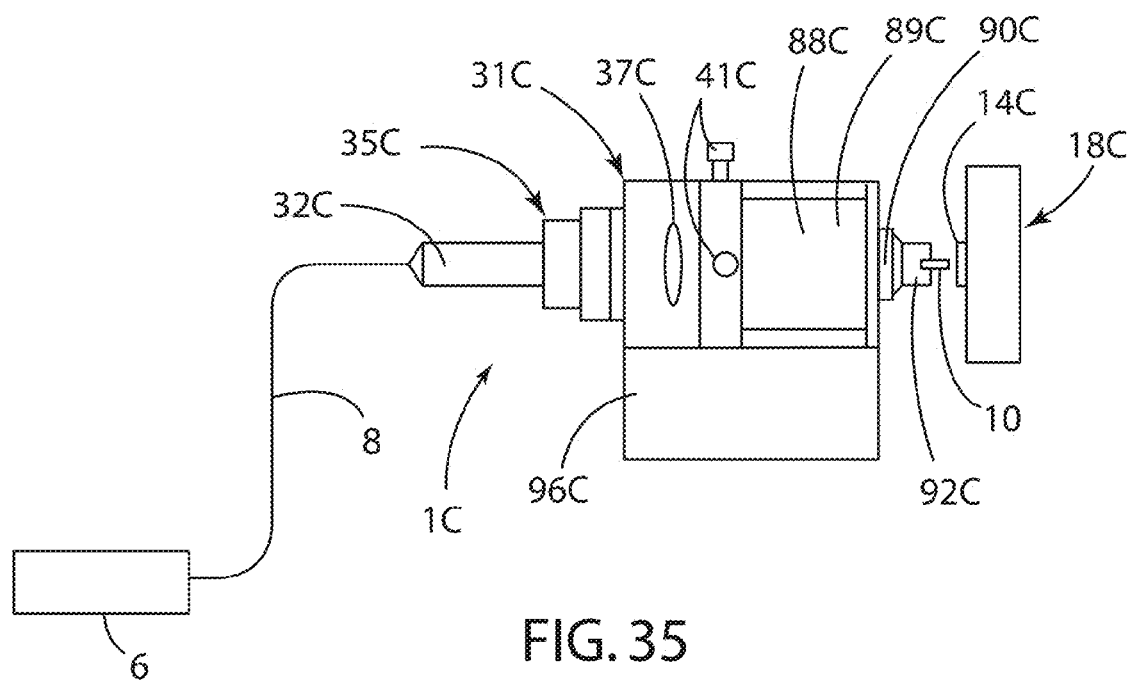
FIG. 35 is a schematic drawing of a tooling setup according to another aspect of the present disclosure.

FIGS. 33-35 are schematic drawings showing various tooling setups that may be utilized in connection with a diamond drill bit 10 according to the present invention.

With reference to FIG. 33, a test setup 1A according to another aspect of the present invention includes a laser source 6 that is operably connected to a fiber optic line 8. The fiber optic line 8 is connected to a collimator 32A, which is supported by a collimator holder 35A. An optical system 31A including one or more lenses 37A focus a laser beam from laser source 6 through the diamond bit 10. The optical system 31A includes beam alignment knobs 41A that can be utilized to direct/focus the laser beam. A spindle/hollow shaft motor 88A includes an internal passageway or space 89A that permits the laser beam to pass through the spindle/hollow shaft motor 88. It will be understood that FIGS. 33-35 are schematic in nature, and the internal passageway 89A of FIG. 33 may be smaller than shown. A tool holder 90A is connected to the spindle 88A, and a tool shank 92A and diamond bit 10 are rigidly connected to the tool holder 90A. A test sample or workpiece 14A is supported by a support or clamp 94. The support or clamp 94 is fixed, and does not rotate during operation. In use, a first or upper portion 98A is stationary, and a second or lower portion 180A is rotational. In use, the diamond bit 10 can be raised and lowered, and rotated as required to drill the workpiece 14A.

With further reference to FIG. 34, a system 1B according to another aspect of the present invention is configured to permit rotation of both diamond bit 10 and a workpiece 14B. A laser source 6 and fiber 8 are connected to a collimator 32B, which is operably connected to an optical system 31B by a collimator holder 34B. Optical system 31B includes beam alignment knobs 41B that permit aligning and/or focusing of a laser beam utilizing one or more lenses 37B. A spindle/hollow shaft motor 88B has an internal passageway 89B that permits the laser beam to pass therethrough. The spindle/hollow shaft motor 88B is mounted on a base 96B. Workpiece 14B is rotatably mounted on a spindle 18 that may rotate during operation. Diamond bit 10 is mounted to a tool shank 92B, which is supported by a tool holder 90B. In operation, the diamond bit 10 and/or the workpiece 14B may be rotated. The spindle 18B may be operably connected to a motor 22 (FIG. 2) as discussed above.

With further reference to FIG. 35, a system 1C according to another aspect of the present disclosure includes a laser source 6 that is operably connected to a collimator 32C by an optical fiber 8. The collimator 32C is supported on an optical system 31C by a collimator holder 35C. The optical system 31C includes one or more lenses 37C, and one or more beam adjustment knobs 41C. The optical system 31C is supported on a base 96C. The diamond bit 10 is supported by tool shank 92C and tool holder 90C. A workpiece 14C is mounted to a rotatable spindle 18C. Spindle 18C may be operably connected to an electric motor 22 (FIG. 2), or suitable compressed air or vacuum motor etc., as discussed in more detail above. In the system 1C of FIG. 35, the tool holder 90C, tool shank 92C, and diamond bit 10 do not rotate. However, the tool holder 90C and tool shank 92C may be translatable relative to workpiece 14C to thereby control the feed rate and the depth of the hole being drilled.

A laser augmented diamond drilling (LADD) process according to the present disclosure may be used for drilling different materials such as ceramics, carbon fiber reinforced composites, ceramic matrix composites, rocks, or gems. Parameters such as RPM, laser power and feed rate may be adjusted as required for particular materials as required. LADD has been demonstrated to be beneficial for composite materials (carbon fiber composites, CFRP) and can be used on ceramic matrix composites (CMCs) as well. LADD reduces the cutting forces, thus decreasing tool bit wear. The LADD process/device described herein improves hole quality and reduces damage to the material when used to drill CFRP and CMC materials.

Cutting fluid may also be utilized in laser augmented drilling processes according to other aspects of the present disclosure. Cutting fluid does not interfere with the laser action because the laser is directed through the drill bit and not outside the drill bit, through the cutting fluid. A laser augmented diamond drilling system/process according to the present invention may be utilized to form precise holes in silicon (and other materials) in a ductile regime with higher edge quality compared to drilling without laser assist. The laser augmented diamond drilling system/process of the present invention can achieve enhanced ductility due to reduced hardness and reduced brittleness resulting from laser assisted heating and thermal softening. The present invention may also provide higher material removal rate, lower electrical power and torque needed, better surface finishes, less damage, higher quality, less tool wear, and less down time for equipment. The present invention thereby provides a more efficient and less costly drilling/machining process.

In addition to diamond, other materials that are optically transparent (to a laser beam) can be utilized to form drill bits according to other aspects of the present disclosure. Examples include sapphire, ruby, emeralds, and garnet. In general, the tool must be harder than the workpiece material. Thus, tools made from other optically transparent materials that are easier to shape can be used effectively with the LADD technology. It will be understood that the term laser augmented diamond drilling (LADD), as used herein, is not limited to processes and devices that utilize diamond drill bits.

The invention claimed is:

1. A method of machining a hard and/or brittle material, the method comprising:
   directing a laser beam into at least a portion of a light-transmitting cutting tool comprising a solid light-transmitting material having at least one cutting edge formed by the solid light-transmitting material at an intersection of a rake face and a flank face whereby the laser beam enters the solid light-transmitting material, is transmitted through the solid light-transmitting material, and exits the solid light-transmitting material through at least one of the cutting edge, the rake face, and the flank face;
   bringing the solid light-transmitting material of the cutting edge into moving contact with a surface of a hard and/or brittle material whereby the laser beam heats the surface and softens the material adjacent the surface.

2. The method of claim 1, wherein:
   the cutting tool has first and second opposite ends, and wherein the cutting edge is disposed on the first end, and the laser beam enters the second end of the cutting tool.

3. The method of claim 1, wherein:
   the light-transmitting material comprises a single crystal diamond.

4. The method of claim 2, wherein:
   the light-transmitting material comprises a poly crystal diamond.

5. The method of claim 1, wherein:
   the cutting tool comprises a drill bit having an elongated cutting edge; and wherein:
   the laser beam has an oblong shape in cross section that is aligned with the elongated cutting edge.

6. The method of claim 1, wherein:
   the brittle material comprises a ceramic.

7. The method of claim 1, wherein:
   the brittle material comprises single crystal silicon.

8. The method of claim 1, including:
   introducing cutting fluid onto at least one of the surface of the brittle material and the cutting tool.

9. The method of claim 1, wherein:
   the cutting tool comprises a drill bit having at least two elongated cutting edges formed by a one-piece single crystal diamond material and wherein:
   the laser beam exits the drill bit along the at least two cutting edges.

10. A laser-assisted machining system, comprising:
    a laser source;
    a movable cutting tool having first and second opposite ends, the second end having at least one cutting edge, and wherein the cutting edge of the cutting tool comprises a substantially solid light-transmitting material;
    wherein the laser source is configured to direct a laser beam from the laser source into the substantially solid light-transmitting material of the cutting tool whereby the laser beam is transmitted through the light-transmitting material and exits the substantially solid light-transmitting material at the second end of the cutting tool and heats a material being machined by the cutting edge of the movable cutting tool wherein the cutting tool comprises a drill bit having at least one cutting edge comprising a light-transmitting diamond material.

11. The laser-assisted machining system of claim 10, wherein:
    the drill bit includes two cutting edges comprising a light-transmitting diamond material.

12. The laser-assisted machining system of claim 10, including:
    an optical fiber operably interconnecting the laser source and the movable cutting tool.

13. The laser-assisted machining system of claim 10, wherein:
    the laser source comprises an IR CW laser.

14. A drill bit assembly comprising:
    a metal body portion having a passageway;
    a drill bit comprising a solid light-transmitting material and having a light-receiving surface formed by the solid light-transmitting material and at least one elongated light-transmitting cutting edge formed by the solid light-transmitting material, wherein the light-receiving surface is in optical communication with the passageway such that a laser beam can be directed through the passageway into the light-receiving surface and through the solid light-transmitting material of the drill bit, whereby the laser beam exits the solid light-transmitting material at the at least one cutting edge.

15. The drill bit assembly of claim 14, wherein:
    the solid light-transmitting material of the drill bit comprises a single crystal diamond material.

16. The drill bit assembly of claim 14, wherein:
    the solid light-transmitting material of the drill bit comprises a poly crystal diamond material.

17. The drill bit assembly of claim 14, wherein:
    the solid light-transmitting material of the drill bit comprises two cutting edges.

18. The drill bit assembly of claim 14, wherein:
    the drill bit comprises a substantially transparent material.

* * * * *

UNITED STATES PATENT AND TRADEMARK OFFICE
CERTIFICATE OF CORRECTION

| | | |
|---|---|---|
| PATENT NO. | : 10,183,337 B2 | Page 1 of 1 |
| APPLICATION NO. | : 15/337617 | |
| DATED | : January 22, 2019 | |
| INVENTOR(S) | : John A. Patten et al. | |

It is certified that error appears in the above-identified patent and that said Letters Patent is hereby corrected as shown below:

In the Specification

On Column 1, Line 12, before the BACKGROUND OF THE INVENTION, please insert the following paragraph:
-- STATEMENT REGARDING FEDERALLY SPONSORED RESEARCH OR DEVELOPMENT
This invention was made with government support under grant number 1445017 awarded by the National Science Foundation. The government has certain rights in the invention. --

Signed and Sealed this
Twentieth Day of August, 2019

Andrei Iancu
*Director of the United States Patent and Trademark Office*